US012065863B2

(12) United States Patent
Roeder et al.

(10) Patent No.: US 12,065,863 B2
(45) Date of Patent: Aug. 20, 2024

(54) MANUAL/POWER DECOUPLING OF LEVER ROTATION

(71) Applicant: Honda Motor Co., Ltd., Tokyo (JP)

(72) Inventors: Brandon C. Roeder, Plain City, OH (US); Steven R. Thiele, Marysville, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 344 days.

(21) Appl. No.: 17/244,229

(22) Filed: Apr. 29, 2021

(65) Prior Publication Data

US 2022/0349222 A1 Nov. 3, 2022

(51) Int. Cl.

| | |
|---|---|
| ***E05B 81/90*** | (2014.01) |
| ***E05B 81/16*** | (2014.01) |
| ***E05B 83/40*** | (2014.01) |
| ***E05B 85/12*** | (2014.01) |

(52) U.S. Cl.

CPC .............. *E05B 81/90* (2013.01); *E05B 81/16* (2013.01); *E05B 83/40* (2013.01); *E05B 85/12* (2013.01)

(58) Field of Classification Search

CPC .......... E05B 81/14; E05B 81/16; E05B 81/25; E05B 81/30; E05B 81/42; E05B 81/46; E05B 81/90; E05B 83/38; E05B 83/40; E05B 79/20; E05B 79/22; E05B 85/12; Y10T 292/1082; Y10T 292/1047; Y10S 292/23; Y10S 292/25; Y10S 292/46; Y10S 292/65

See application file for complete search history.

(56) References Cited

U.S. PATENT DOCUMENTS

| | | | | |
|---|---|---|---|---|
| 6,079,767 | A | 6/2000 | Faubert et al. | |
| 6,321,488 | B1 * | 11/2001 | Bigoszewski | E05F 15/638 49/362 |
| 6,341,448 | B1 | 1/2002 | Murray et al. | |
| 6,359,762 | B1 | 3/2002 | Yokomori | |
| 6,406,075 | B1 * | 6/2002 | Rice | E05B 85/18 70/210 |
| 6,430,875 | B1 | 8/2002 | Clark et al. | |
| 6,739,646 | B2 | 5/2004 | Suzuki et al. | |
| 7,175,228 | B2 | 2/2007 | Mrkovic et al. | |
| 7,441,816 | B2 | 10/2008 | Watanabe et al. | |
| 8,061,742 | B2 | 11/2011 | Machida et al. | |

(Continued)

FOREIGN PATENT DOCUMENTS

| | | | |
|---|---|---|---|
| EP | 1635017 A2 * | 3/2006 | E05B 81/20 |
| JP | 2957893 | 10/1996 | |

(Continued)

*Primary Examiner* — Christine M Mills
*Assistant Examiner* — Christopher F Callahan
(74) *Attorney, Agent, or Firm* — RANKIN, HILL & CLARK LLP

(57) ABSTRACT

An opening/closing assembly for a door configured to actuate certain latches during a powered operation and to actuate not all the same latches during a manual (emergency) operation. The assembly operates to decouple the operation of levers associated to the various latches of the door. The assembly is configured such that a hold-close latch is actuated for both a powered operation and a manual operation, while a hold-open latch is not actuated during the manual operation and is only actuated during the powered operation.

19 Claims, 8 Drawing Sheets

(56) References Cited

U.S. PATENT DOCUMENTS

| | | | | |
|---|---|---|---|---|
| 10,472,866 | B2 | 11/2019 | Kaino | |
| 2008/0001412 | A1* | 1/2008 | Nozawa | E05B 81/06 292/2 |
| 2012/0056437 | A1* | 3/2012 | Takayanagi | E05B 77/265 292/118 |
| 2016/0010364 | A1* | 1/2016 | Hanaki | E05B 83/40 292/201 |
| 2016/0010365 | A1* | 1/2016 | Hanaki | E05B 79/20 292/45 |
| 2016/0017644 | A1* | 1/2016 | Okuma | E05B 81/20 292/201 |
| 2016/0312500 | A1* | 10/2016 | Hiramoto | E05B 81/16 |
| 2020/0332570 | A1 | 10/2020 | Tomaszewski | |

FOREIGN PATENT DOCUMENTS

| | | | | |
|---|---|---|---|---|
| JP | 2016205032 A | * 12/2016 | | E05B 79/20 |
| WO | 0053877 | 9/2000 | | |
| WO | 2018186111 | 10/2018 | | |
| WO | 2020106940 | 5/2020 | | |

* cited by examiner

MANUAL/POWER DECOUPLING OF LEVER ROTATION

BACKGROUND

An interior manually operated handle for operating a power door on a vehicle is typically configured to be operated with one hand. Utilizing a single hand, the user moves the handle from an initial non-actuating position, to an actuating position, which causes the door to open or close under power. Once the user releases the handle, the handle is automatically returned from the actuating position back to the initial non-actuating position.

This one-handed operation of the handle to open the power door may be convenient for operating the door in a non-emergency situation, where power is still being supplied to the door for power assisting movement of the door from a closed position to an opened position. However, it may not be convenient in an emergency situation, such as where power is not being supplied to the door to assist its opening, and thus moving the door from the closed position to the opened position could be completely dependent upon the strength of the user to move the door, which may be quite heavy and cumbersome to move.

In these emergency situations however, where no power is being supplied to the door, one of the user's hands must be kept on the biased handle to hold it in the actuating position so as to actuate a latch to release the door from the closed position, while at the same time the user must use the other hand to push the door away from the closed position towards the opened position. This single-hand actuation of the handle while simultaneously pushing the door open with the other hand is necessary because, if the handle is instead released before the door is moved from the closed position, then the latch may re-engage an anchor and not release the door from the closed position. Furthermore, if the door is initially moved from the closed position but accidentally returns to the closed position, such as if the vehicle is on an inclined surface causing the door to swing or roll closed, then the latch may re-engage the anchor, and thus require another operation of the handle for its release from the anchor.

If the door is heavy or otherwise difficult to open, then using only one hand to push the door may therefore not result in the door being opened so as to allow the user to exit the vehicle, which could prove consequential in an emergency situation. Using two hands to push the door could help in opening the door enough to allow the user to leave the vehicle. However, this is always not possible, especially at the start of the door-opening process when one hand has to be used to operate the handle to release the door from the closed position.

BRIEF DESCRIPTION

According to one aspect, an opening and closing assembly for a door has a powered operation and a manual operation. The assembly includes a first cable and a second cable. The first cable is operatively connected to a first latch that holds the door in a closed position. The second cable is operatively connected to a second latch that holds the door in an opened position. The first cable is pulled during both the powered operation of the assembly and the manual operation of the assembly. The second cable is pulled during the powered operation of the assembly and not during the manual operation of the assembly. When the door is held in the closed position by the first latch and the first cable is pulled, the first latch is actuated to release the door from the closed position. When the door is held in the opened position by the second latch and the second cable is pulled, the second latch is actuated to release the door from the opened position.

According to another aspect, a door includes a first latch, a second latch, and an opening and closing assembly. The first latch can be actuated or not actuated. When the door is in a closed position and the first latch is not actuated, the first latch holds the door in the closed position. A second latch that can be actuated or not actuated. When the door is in an opened position and the second latch is not actuated, the second latch holds the door in the opened position. The opening and closing assembly has a powered operation and a manual operation. The assembly is operatively connected to the first latch for actuating the first latch, and is operatively connected to the second latch for actuating the second latch. During the powered operation, the assembly actuates the first latch and actuates the second latch. During the manual operation, the assembly actuates the first latch and does not actuate the second latch.

According to another aspect, vehicle includes a door having a first latch, a second latch, and an opening and closing assembly. The first latch can be actuated or not actuated. When the door is in a closed position and the first latch is not actuated, the first latch holds the door in the closed position. A second latch that can be actuated or not actuated. When the door is in an opened position and the second latch is not actuated, the second latch holds the door in the opened position. The opening and closing assembly has a powered operation and a manual operation. The assembly is operatively connected to the first latch for actuating the first latch, and is operatively connected to the second latch for actuating the second latch. During the powered operation, the assembly actuates the first latch and actuates the second latch. During the manual operation, the assembly actuates the first latch and does not actuate the second latch. The door is a sliding door of the vehicle that slides between the opened position and the closed position.

DETAILED DESCRIPTION

The present invention relates to an assembly that allows for pushing open a door, e.g. a door of a vehicle, using two hands. The invention includes an emergency mechanism, including a manually operated emergency handle for manually opening a powered door. The handle can be operated by a user with one hand. When operated by the user, the handle is moved from an initial non-actuating position to an actuating position so as to actuate a latch of the door that releases the door from a closed position. When moved to the actuating position, the handle is held in the actuating position, which causes the continual actuation of the latch (e.g. holds the latch open) so that the door cannot be held by the latch in the closed position. Because the handle is held in the actuating position and the latch therefore cannot hold the door in the closed position, a user can let go of the handle and then utilize both hands to push open the door from the closed position to an opened position. Use of both hands allows the user to exert more power to open the door, which may make opening the door easier, especially if the door is heavy or otherwise difficult to move to the opened position.

Figure 1:
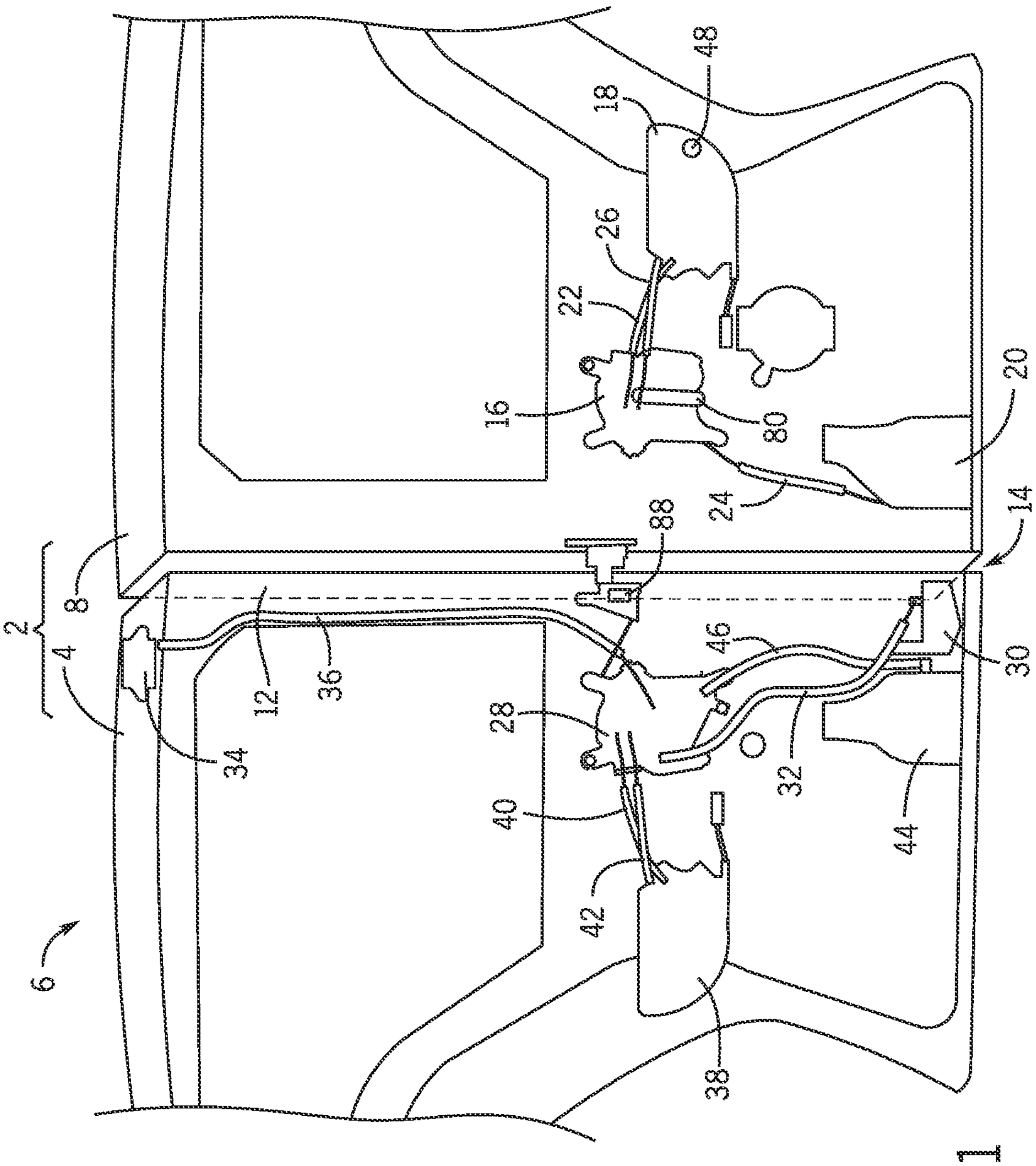
FIG. 1 is interior side view of a double door assembly according to the present subject matter.
Figure 2:
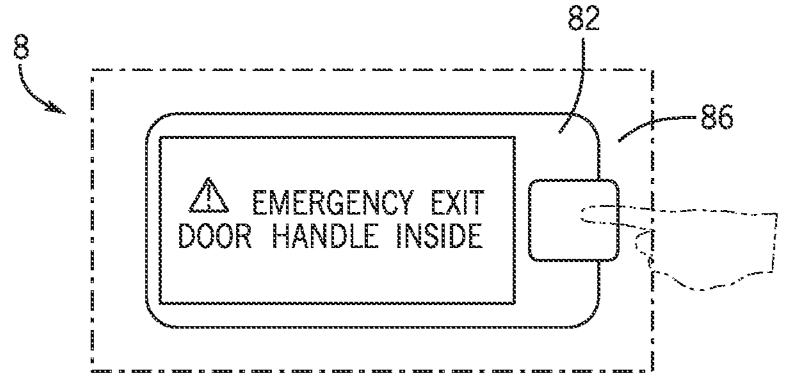
FIGS. 2-6 are schematic views showing an operation of the double door assembly of FIG. 1.

With reference to the figures, a double door assembly 2 is shown in FIG. 1, which is a view from an interior of the vehicle 6. The assembly 2 includes a front door 4, which may be arranged toward a front of a vehicle 6, and a rear door 8, which may be arranged toward a rear of the vehicle 6. The front door 4 and rear door 8 may be sliding doors (FIGS. 4 and 6) that close off an entrance/exit opening 10 of the vehicle 6, and slide on rails/rollers to open. The doors 4, 8 may slide in opposite directions away from each other so as to allow for passengers to enter and exit the vehicle through the opening 10. The doors 4, 8 are not limited to being vehicle doors or to being sliding doors, and may be doors on other structures and may be hinged doors that swing open or other types of doors that open in a different manner.

When the front door 4 is closed (i.e. is in a closed arrangement) and the rear door 8 is closed (i.e. in a closed position), a flange 12 or other portion of the rear door 8 may overlap the front door along their interface 14 so that the flange 12 or other portion of the rear door 8 overlaps a portion of the front door 4 from a perspective exterior to the vehicle 6 (See FIG. 1). This overlap may allow the rear door 8 to be opened without first opening the front door 4, and may prevent the front door 4 from being opened without first opening the rear door 8. However, this opening sequence is not required, and even if the overlapped flange 12 is present, the front door 4 and rear door 8 may open without having to first open the other door.

The invention includes a first opening and closing assembly 16, a first latch 18 (a "hold-close latch"), a second latch 20 ("hold-open latch"), a first cable 22, a second cable 24, and optionally a third cable 26 operatively connecting the first assembly 16 to the first latch 18. While the invention is discussed with respect to the rear door 8, it is not limited to this configuration and can also be applicable to the front door 4 or to other doors, for example, to a single door.

The first assembly 16 is for opening and closing the rear door 8. The first cable 22 operatively connects the first assembly 16 to the first latch 18. The first assembly 16 can be operated to pull the first cable 22 to actuate the first latch 18. The first cable 22 is pulled away from the first latch 18 and toward the first assembly 16. The second cable 24 operatively connects the first assembly 16 to the second latch 20. The first assembly 16 can be operated to pull the second cable 24 to actuate the second latch 20. The second cable 24 is pulled away from the second latch 20 and toward the first assembly 16

When the rear door 8 is in the closed position (see FIG. 1 and hashed lines in FIG. 4) and the first latch 18 is not actuated, the first latch 18 engages a first anchor 48 of the vehicle 6 to hold the rear door 8 in the closed position. When the rear door 8 is in the closed position and the first latch 18 is actuated, the first latch 18 disengages from the first anchor 48, thus releasing the rear door 8 from the closed position and allowing the rear door 8 to be moved from the closed position towards the opened position. When the rear door 8 is in the opened position, the first latch 18 is distanced from, and thus cannot engage, the first anchor 48. When the rear door 8 is in the opened position, the first assembly 16 may still actuate the first latch 18. However, this actuation does not cause the first latch 18 to engage or disengage the first anchor 48 since they are spaced from each other due to the opening of the rear door 8.

When the rear door 8 is in the opened position (see solid lines in FIG. 4 and FIG. 6) and the second latch 20 is not actuated, the second latch 20 engages a second anchor 50 of the vehicle 6 to hold the rear door 8 in the opened position. When the rear door 8 is in the opened position and the second latch 20 is actuated, the second latch 20 disengages from the second anchor 50, thus releasing the rear door 8 from the opened position and allowing the rear door 8 to be moved from the opened position towards the closed position. When the rear door 8 is in the closed position, the second latch 20 is distanced from, and thus cannot engage, the second anchor 50. When the rear door 8 is in the closed position, the first assembly 16 may still actuate the second latch 20. However, this actuation does not cause the second latch 20 to engage or disengage the second anchor 50 since they are spaced from each other due to the closing of the rear door 8.

The latches 18, 20 and anchors 48, 50 are not particularly limited, and the latches 18, 20 may engage the respective anchors 48, 50 mechanically, magnetically, or otherwise. Actuation of the latches 18, 20 may include moving (e.g. opening the latches), manipulating, or changing a state of the latches 18, 20 such that they disengage the respective anchor 48, 50.

The front door 4 may include a second opening and closing assembly 28 for opening and closing the front door 4; a third latch 30 for holding a bottom of the front door 4 in a closed arrangement (see FIG. 1, FIG. 4, and dashed lines in FIG. 6); a fourth cable 32 operatively connecting the second assembly 28 to the third latch 30 to release the bottom of the front door 4 from the closed arrangement; a fourth latch 34 for holding a top of the front door 4 in the closed arrangement; a fifth cable 36 operatively connecting the second assembly 28 to the fourth latch 34 for actuating the fourth latch 34 to release the top of the front door 4 from the closed arrangement, a fifth latch 38 for holding a front of the front door 4 in the closed arrangement; a sixth cable 40 operatively connecting the second assembly 28 to the fifth latch 38 for actuating the fifth latch 38 to release the front of the front door 4 from the closed arrangement; optionally a seventh cable 42 operatively connecting the first assembly 16 to the fifth latch 38; a sixth latch 44 for holding the front door 4 in an opened arrangement (see solid lines in FIG. 6), and an eighth cable 46 operatively connecting the first assembly 16 to the sixth latch 44 for actuating the sixth latch 44 to release the front door 4 from the opened arrangement.

The first assembly 16 includes a base plate 52, a first lever 54, a second lever 56, a handle 80, a powered actuator 60 (e.g. motor), and a lock 62. The base plate 52 is mounted on the rear door 8. The first lever 54, the second lever 56, and the handle 80 are rotatably mounted to the base plate 52, and may be coaxially mounted to the base plate 52 at a shared/common axis 64. The first cable 22 operatively connects the first lever 54 to the first latch 18. When the first lever 54 is rotated relative to the base plate 52 in a first rotational direction ($R_1$), the first lever 54 pulls the first cable 22, thus actuating the first latch 18. Although the first rotational direction is shown to be in a counter-clockwise direction, this is not necessary and the first rotational direction may be in a clockwise direction. The second cable 24 operatively connects the second lever 56 to the second latch 20. When the second lever 56 is rotated relative to the base plate 52 in the first rotational direction, the second lever 56 pulls the second cable 24, thus actuating the second latch 20. The rotation of the second lever 56 in the first rotational direction causes the rotation of the rotation of the first lever 54 in the first rotational direction. The rotation of the first lever 54 in the first rotational direction does not cause the rotation of the second lever 56 in the first rotational direction.

The rear door 8 and first assembly 16 have a powered operation and a manual (e.g. emergency) operation.

1. Powered Operation

Figure 7:
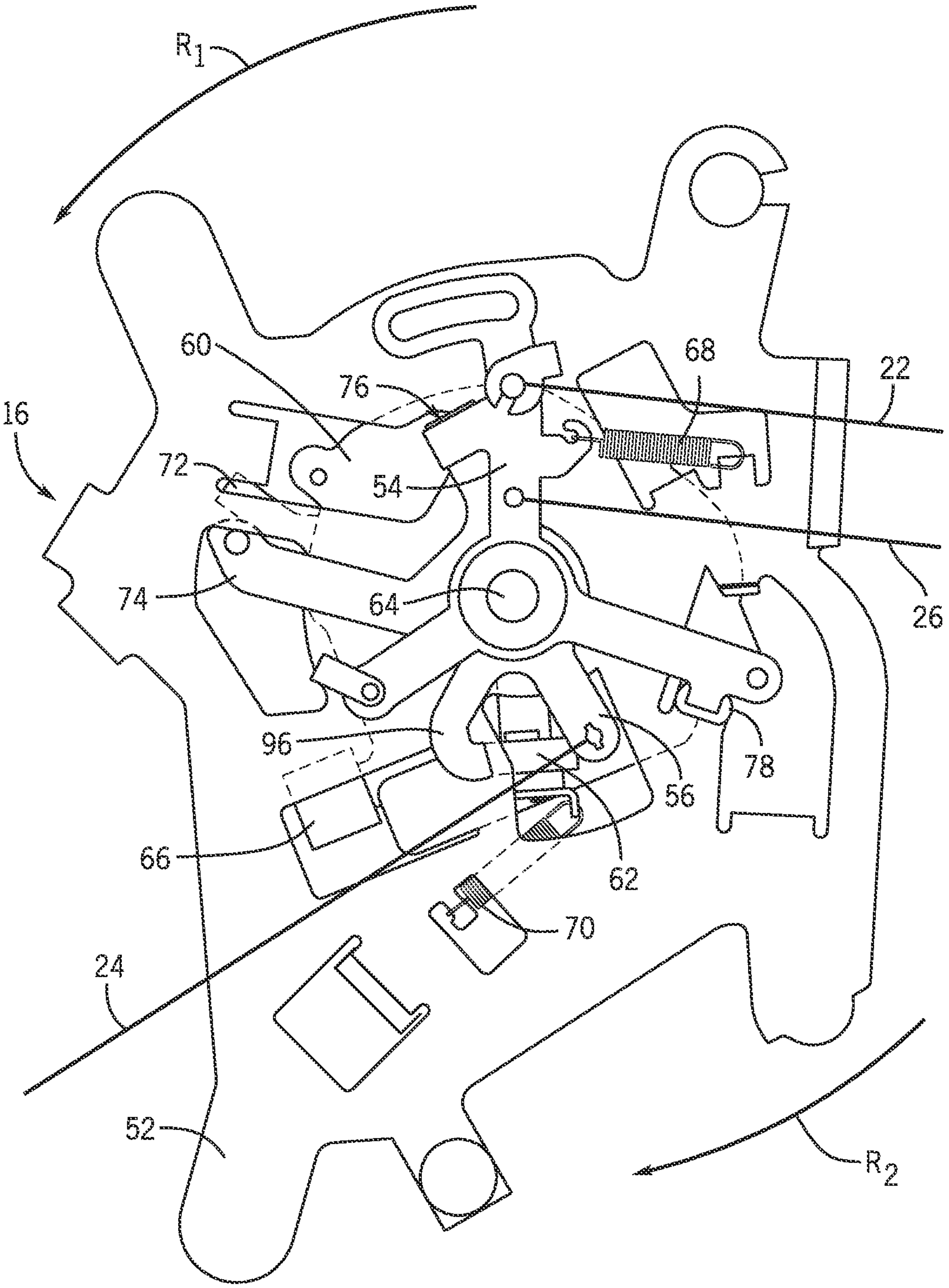
FIG. 7 is a side view of an opening and closing assembly of a door according to the present subject matter.
Figure 8:
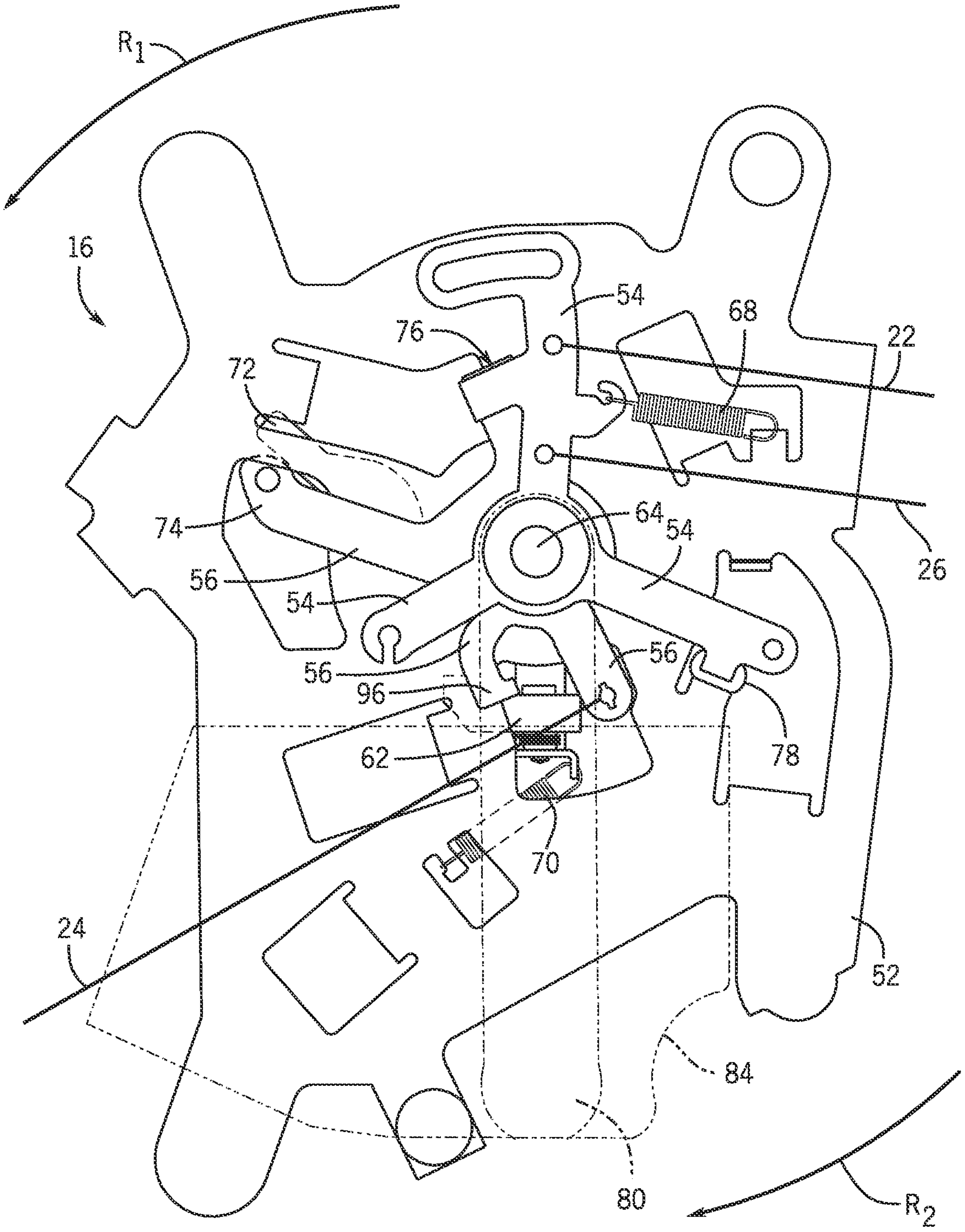
FIG. 8 is another side view of the opening and closing assembly of FIG. 7.

Referring now to FIGS. 7-8, FIG. 7 depicts various components of the first assembly 16 but without the handle 80 but with the powered actuator 60, and FIG. 8 depicts various components of the first assembly 16 in relation to the opening 84 and handle 80 in dashed lines, but without the powered actuator 60. As shown in FIGS. 7-8, the first assembly 16 is not operating, and therefore not actuating the first latch 18 or the second latch 20. As such, both latches 18, 20 are free to engage their respective anchors 48, 50.

During the powered operation, the first assembly 16 operates under power to actuate the first and second latches 18, 20 and thus release the rear door 8 from the closed position or release the rear door 8 from the opened position. The rear door 8 is then able to be moved under power from the just-released position (i.e. opened position or closed position) toward the other position. For this purpose, the first assembly 16 includes the powered actuator 60 (FIG. 7).

The actuator 60 operates under power to pull the first cable 22 and the second cable 24 to release the rear door 8, and then move the rear door 8 between the open and closed positions. The actuator 60 may be connected to or include a power source for powering its operation, e.g. connected to a vehicle power source or include a battery. The actuator 60 may include a port 66 (FIG. 7) for connecting with a power source via a harness.

The actuator 60 operates to rotate the second lever 56 in the first rotational direction. The actuator 60 includes an arm 72 that engages an arm 74 of the second lever 56. Movement of the arm 72 of the actuator 60 causes rotational movement of the second lever 56 in the first rotational direction ($R_1$, which is opposite from $R_2$) by engagement with the arm 74 of the second lever 56. This rotation of the second lever 56 pulls the second cable 24, thus actuating the second latch 20. This rotation of the second lever 56 also causes the first lever 54 to rotate in the first rotational direction by the second lever 56 engaging the first lever 54 at a joint 76 between them. This rotation of the first lever 54 pulls the first cable 22, thus actuating the first latch 18.

When the rear door 8 is released from the open or closed positions in the powered operation, the rear door 8 may be moved under power away from the just-released opened position or closed position and toward the other position, e.g. by a motor and cable assembly (not shown).

When the rear door 8 is released from the closed position and from the opened position, both the first and second latches 18, 20 are actuated. When released from the closed position, the rear door 8 is then moved away from the closed position such that first latch 18 is spaced from the first anchor 48 and can no longer engage the first anchor 48 to hold the rear door 8 in the closed position. When the rear door 8 is released from the opened position, the rear door 8 is then moved away from the opened position such that second latch 20 is spaced from the second anchor 50 and can no longer engage the second anchor 50 to hold the rear door 8 in the opened position.

When moved away from the opened position and from the closed position, the actuator 60 is then deactivated, which allows the first lever 54 and the second lever 56 to rotate in the second rotational direction ($R_2$) so that the levers 54, 56 no longer pull the cables 22, 24 and no longer actuate the latches 18, 20.

The rotation of the first lever 54 in the second rotational direction may be caused by a biasing member, e.g. by a spring 68, that urges the first lever in the second rotational direction. The joint 76 allows the first lever 54, while it is rotating in the second rotational direction, to engage the second lever 56 and cause the second lever 56 to also rotate in the second rotational direction. The first lever 54 includes a stopper 78 that stops further rotation of the first lever 54 in the second rotational direction, e.g. by engaging with a portion of the base plate 52.

When the second latch 20 is no longer being actuated, the second latch 20 is then able to re-engage the second anchor 50 if and when the rear door 8 is moved to the open position, so as to again hold the rear door 8 in the opened position. When the first latch 18 is no longer being actuated, the first latch 18 is then able to re-engage the first anchor 48 if and when the rear door 8 is returned to the closed position so that the first latch 18 again can hold the rear door 8 in the closed position.

2. Manual Operation

Figure 3:
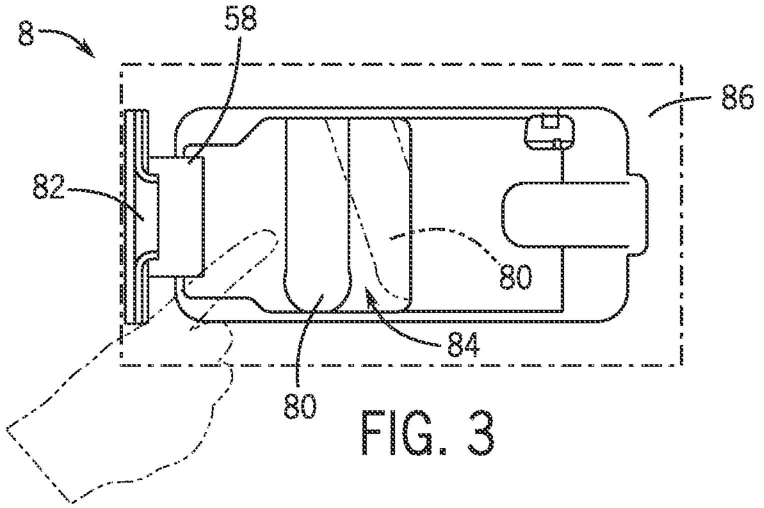

FIGS. 9A-9E depict a detailed portion of the first assembly 16, but for simplicity without the handle 80 being shown, the arrangement and movement of which is depicted instead in FIGS. 3 and 8.

Figure 9A:
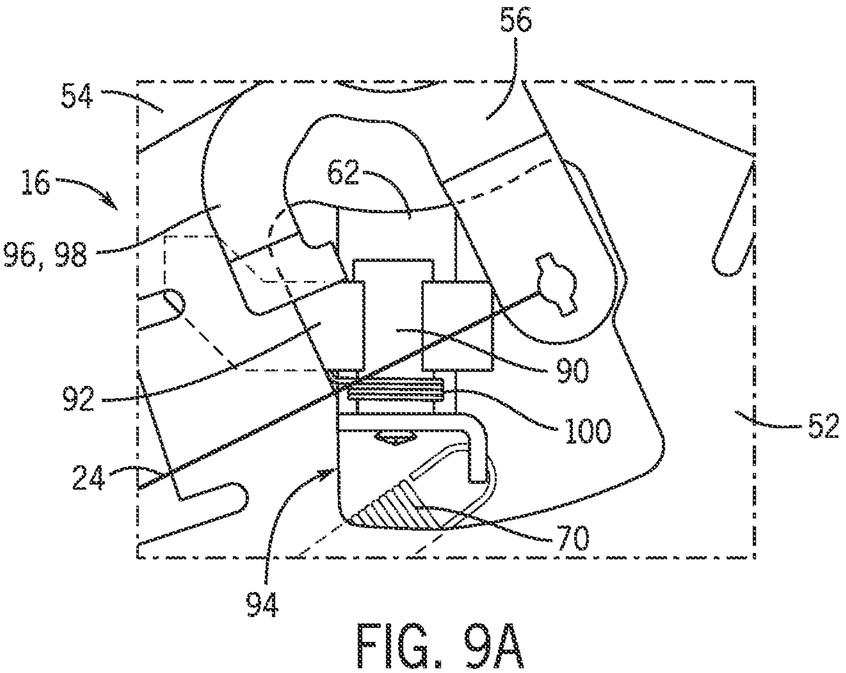
FIGS. 9A-9E are detailed views of the opening and closing assembly of FIG. 7 during a manual operation of the opening and closing assembly.
Figure 9B:
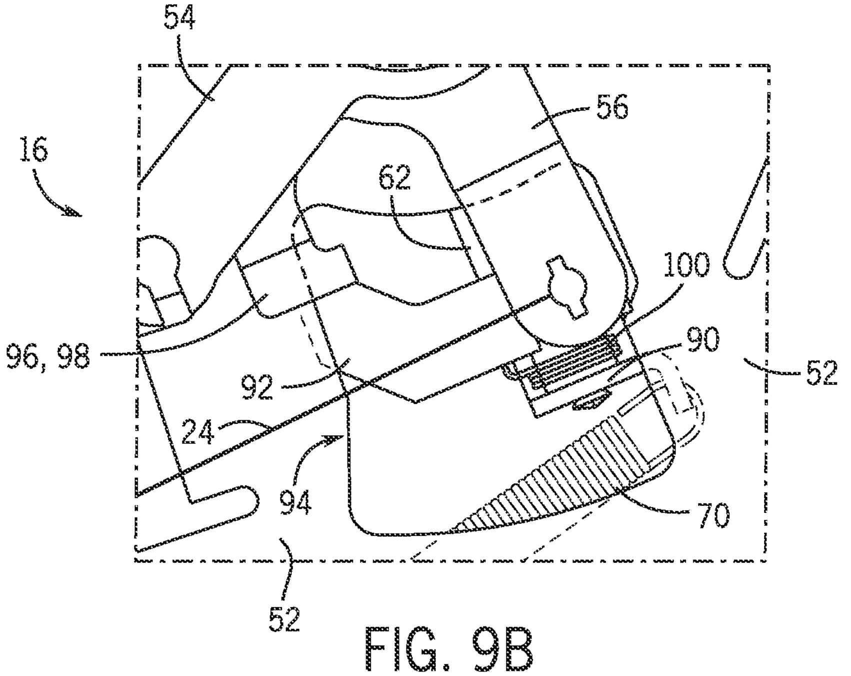
Figure 9C:
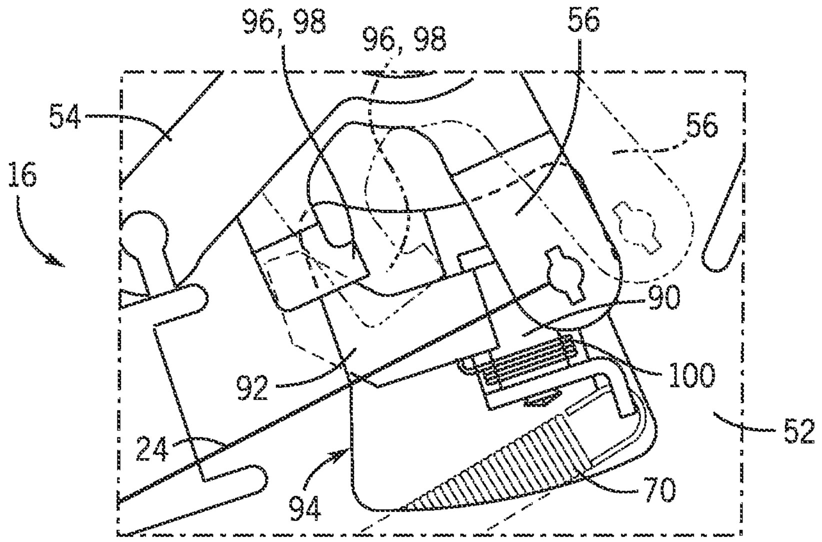
Figure 9D:
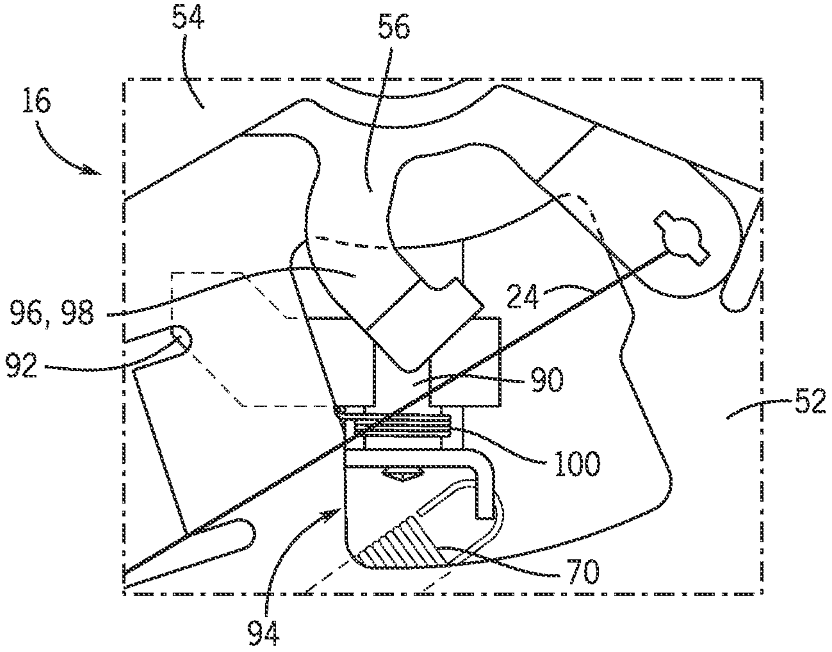
Figure 9E:
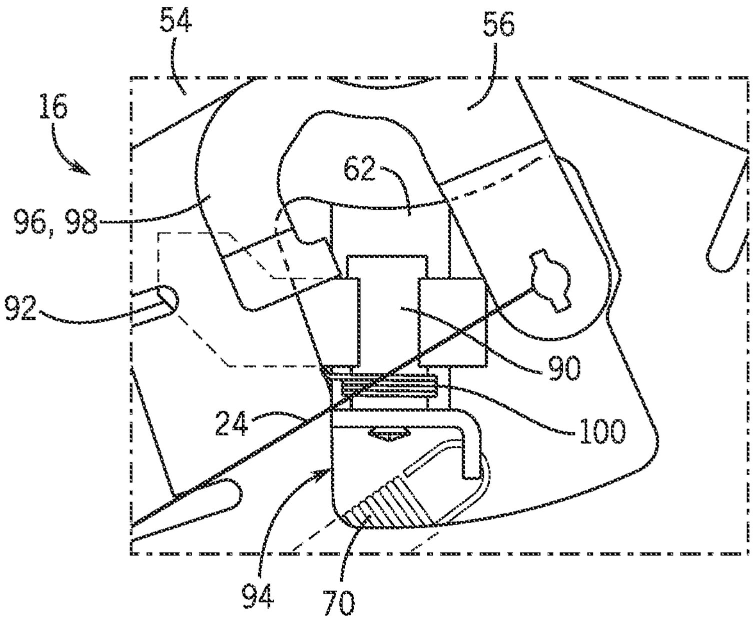

FIGS. 9A-9E depict the mechanical movements of various components of the first assembly 16 during the manual operation of the first assembly 16 and during a return or resetting of the first assembly 16 to a non-operational position. FIG. 9A shows the first assembly 16 not being operated, where the handle 80 is in an initial non-actuating position (see FIG. 1, solid lines in FIG. 3, and dashed lines in FIG. 8). FIG. 9B shows the first assembly 16 having been operated to pull the first cable 22 to actuate the first latch 18, where the handle 80 has been moved to, and held in, an actuating position (see dashed lines in FIG. 3). FIGS. 9C-9D show a resetting of the first assembly 16 so it is not operating, where a powered operation of the first assembly 16 causes the handle 80 to return to the non-actuating position.

During the manual operation (e.g. when there is no powered operation of the rear door 8 or first assembly 16, such as in an emergency situation), a user manually operates the first assembly 16 to actuate only the first latch 18 to thereby release the rear door 8 from the closed position. The user is then able to move the rear door 8 away from the closed position and toward the open position.

For this manual operation, the first assembly 16 includes the manually operated handle 80 that is operatively connected to the first latch 18, and can be manually operated by the user using their hand or finger(s). Manual operation of the handle 80 includes moving the handle 80 from the initial non-actuating position, which does not actuate the first latch 18, to the actuating position, which does actuate the first latch 18.

With reference to FIGS. 2-6, which show a schematic operation of the double door assembly 2, the handle 80 may be covered by a manually removable panel 82 of the rear door 8, which panel 82 is moved (FIG. 3) at a hinge 58 to uncover the handle 80 to allow the user to manually move the handle 80 from the non-actuating position to the actuating position. As shown in the detailed portions of the rear door 8 in FIGS. 2-3, the panel 82 may cover an opening 84 in a door panel 86, which opening 84 provides access to the handle 80 for the manual operation thereof by a user.

The handle 80 is mounted to the first assembly 16 and is operatively connected to the first lever 54. Moving the handle 80 to the actuating position causes the first lever 54 to rotate in the first rotational direction. The handle 80 may be rotatably mounted to the first assembly 16, e.g. at the axis 64, such that rotation of the handle in the first rotational direction causes the first lever 54 to rotate in the first rotational direction to pull the first cable 22 and actuate the first latch 18, which thus releases the rear door 8 from the closed position.

Figure 4:
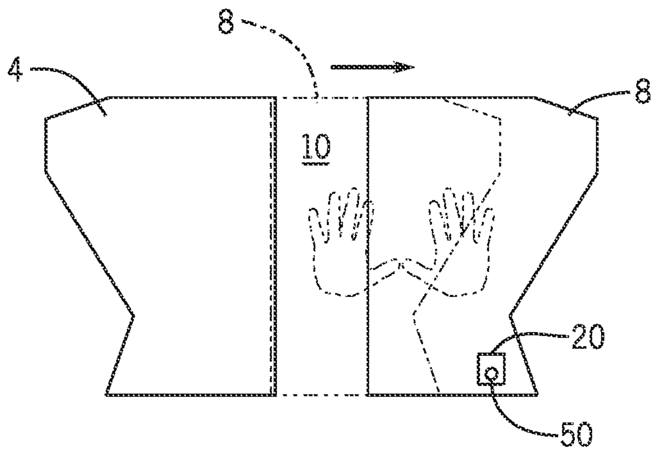
Figure 5:
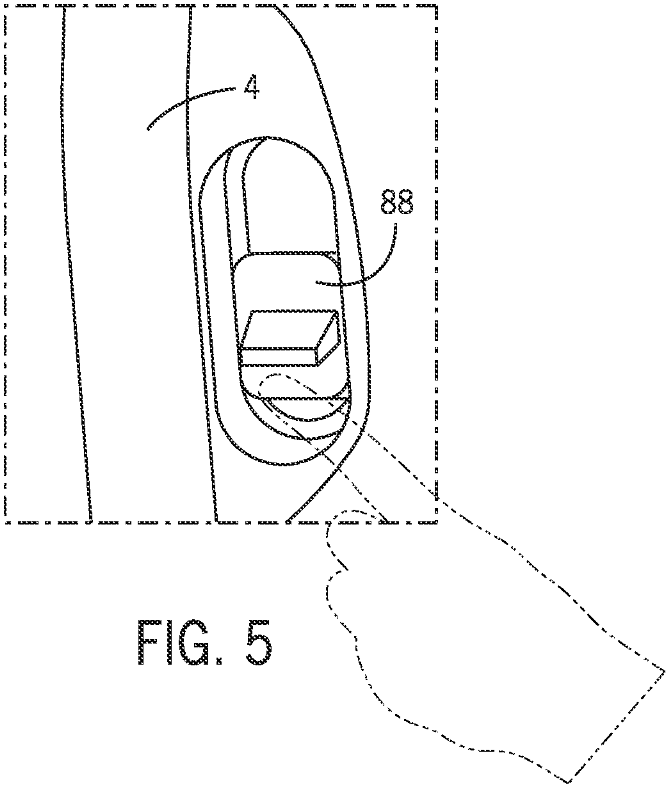
Figure 6:
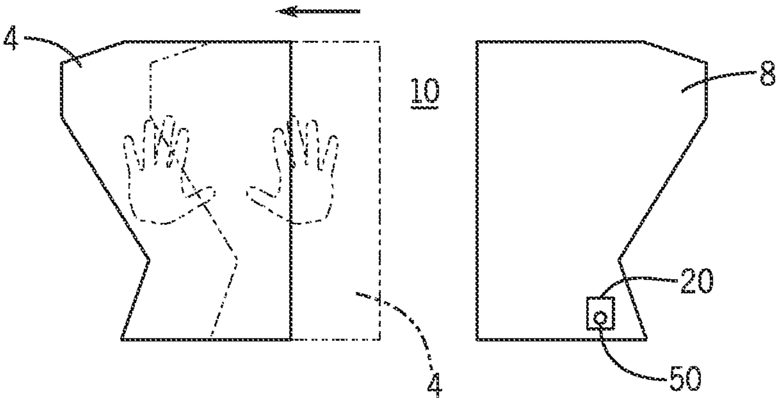

When the first latch 18 is actuated in the manual operation, the first latch 18 remains actuated until a subsequent powered operation of the first assembly 16. As such, the first latch 18 is unable to engage the first anchor 48 to hold the rear door 8 in the closed position until a subsequent powered operation of the first assembly 16 is executed. The user is then able to use both hands to push the rear door 8 to the opened position as schematically depicted in FIG. 4. Optionally, the front door 4 may include an emergency activator 88 that can be operated manually by a user a depicted in FIG. 5, which is a detailed view of a portion of the front door 4. Operating the emergency activator 88 releases the front door 4 from the closed arrangement, and thus allows the user to use both hands to move the front door 4 from the closed arrangement to the opened arrangement as schematically depicted in FIG. 6. The emergency activator 88 may be arranged near the interface 14 of the doors 4, 8, and may only be accessible to a user for operation when the rear door 8 is not in the closed position.

The first assembly 16 includes the lock 62, which is operatively connected to the handle 80 and operates to hold/lock the handle 80 in the actuating position. Having the handle 80 being held/locked in the actuating position causes the first latch 18 to be actuated and remain actuated until the handle 80 is returned to the non-actuating position.

The lock 62 is mounted on the first assembly 16, and is operatively connected, e.g. rigidly connected, to the handle 80 such that movement of the handle 80 causes a corresponding movement of the lock 62 and vice versa. The lock 62 may thus be rotatably mounted to the first assembly 16, e.g. at the axis 64. Manual rotation of the handle 80 in the first rotational direction causes the lock 62 to also rotate in the first rotational direction from an initial position (FIG. 9A) to a locking position (FIG. 9B). When the lock 62 is in the initial position, the lock 62 does not restrict movement of the handle 80. When the lock 62 is moved to the locking position, the lock 62 operates to hold the handle 80 in the actuating position. The lock 62 may include a body 90 and swinging arm 92 mounted to the end of the body 90. The swinging arm 92 may rotate under biasing from a spring 100 about a longitudinal axis of the body 90, e.g. out of the page of the drawing in FIGS. 9A and 9B toward the viewer, when the lock 62 is moved to the locking position. When the arm 92 is rotated in this manner and when in the locking position, the arm 92 may engage a portion of the base plate 52, e.g. a locking opening 94 in the base plate 52, to hold the lock 62 in the locking position and thus hold the handle 80 in the actuating position.

The first latch 18 thus remains actuated, making the first latch 18 unable to engage the first anchor 48 even if the rear door 8 is in the closed position. As such, the first latch 18 is unable to hold the rear door 8 in the closed position. This allows the user to use both hands to push the rear door 8 from the closed position, from which it was just released, toward the opened position. This also does not require the user to use one hand to operate the handle 80, and simultaneously use the other hand to push open the rear door 8. Using both hands to push open the rear door 8 makes opening the rear door 8 easier in a non-powered (e.g. emergency) manual operation of the rear door 8.

In the manual operation of the rear door 8 and first assembly 16, operation of the handle 80 does not cause an operation of the second lever 56. This is because the first lever 54 can disengage from the second lever 56 at the joint 76, and thus allows the first lever 54 to be rotated in the first rotational direction without rotating the second sever 56 in the first rotational direction. As such, the second cable 24 is not pulled and the second latch 20 is not actuated during the manual operation. When the user pushes the rear door 8 to the opened position, the second latch 20 is thus able to engage the second anchor 50 (FIG. 6) to hold the rear door 8 in the opened position, and thus prevents the rear door 8 from closing on the user.

The lock 62 is held in the locking position and the handle 80 is held in the actuating position until a subsequent powered operation of the first assembly 16, at which point a lock release 96 releases the lock 62 from the locking position and thus releases the handle 80 from the actuating position. The lock 62 may be biased by a biasing member, e.g. a spring 70, which urges the lock back to the initial position.

The lock release 96 may include an unlocking arm 98 of the second lever 56. When the second lever 56 is operated in the subsequent powered operation to rotate in the first rotational direction, the unlocking arm 98 engages/contacts the swinging arm 92 of the lock 62 to push the swinging arm 92 out of the locking position, thus allowing the lock 62 to rotate in the second rotational direction under urging from the spring 70 back to the initial position, which thereby allows the handle 80 to rotate back to the non-actuating position under urging from the spring 68, which causes the first latch 18 to be not actuated and thus allows the first latch 18 to engage the first anchor 48 if the rear door 8 is moved to the closed position. Moreover, rotation of the second lever 56 in the subsequent powered operation also causes the second cable 24 to be pulled, thus actuating the second latch 20, which at that point may be engaging the second anchor 50 to hold the rear door 8 in the opened position. When actuated in the subsequent powered operation, the second latch 20 disengages the second anchor 50, and thus releases the rear door 8 from the closed position allowing the rear door 8 to be moved from the closed position towards the opened position.

The present invention thus includes an assembly configured to pull certain cables during a powered operation and others during a manual (emergency) operation. The system decouples the operation of levers for certain latches of the sliding door assembly. The assembly is configured such that a cable for a hold-close latch is pulled for both a powered operation and a manual (emergency) operation. However, a cable for a hold-open latch is not pulled during the manual (emergency) operation and is only pulled during the powered operation. Further, during the manual operation an actuation handle is held in the actuating position, and the handle is reset to a non-actuating position during a subsequent powered operation.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An opening and closing assembly for a door and having a powered operation and a manual operation, the assembly comprising a first cable, a first lever, a second cable and a second lever, wherein:
 - the first cable is operatively connected to a first latch that holds the door in a closed position;
 - the second cable is operatively connected to a second latch that holds the door in an opened position;
 - the first cable is pulled during both the powered operation of the assembly and the manual operation of the assembly;
 - the second cable is pulled during the powered operation of the assembly and not during the manual operation of the assembly;
 - when the door is held in the closed position by the first latch and the first cable is pulled, the first latch is actuated to release the door from the closed position; and
 - when the door is held in the opened position by the second latch and the second cable is pulled, the second latch is actuated to release the door from the opened position, and wherein:
 - the first lever is connected to the first latch by the first cable, and is operable to pull the first cable;
 - the second lever is connected to the second latch by the second cable, and is operable to pull the second cable;
 - the first lever and the second lever are both operated during the powered operation of the assembly; and
 - the first lever is operated during the manual operation of the assembly and said operation of the first lever does not cause operation of the second lever,
 - the second lever is not operated during the manual operation of the assembly but operation of the second lever does cause operation of the first lever.

2. The assembly according to claim 1, further comprising a manually operated handle operatively connected to the first cable,
 - wherein the manual operation of the assembly includes manual operation of the handle by a user, which results in the first cable being pulled to actuate the first latch.

3. The assembly according to claim 2, wherein the manually operated handle is disposed on an inside of the door so as to be accessible from inside a passenger compartment of a vehicle on which the door is disposed.

4. The assembly according to claim 1, wherein:
 - the first lever and the and the second lever are rotatably mounted on a common axis on a base plate;
 - operation of the first lever includes rotating the first lever about the axis; and
 - operation of the second lever includes rotating the second lever about the axis.

5. The assembly according to claim 4, wherein:
 - operation of the first lever to pull the first cable includes rotating the first lever about the axis in a first rotational direction; and
 - the first lever is rotationally biased by a biasing member to move in a second rotational direction.

6. The assembly according to claim 5, further including a manually operated handle connected to the first lever, wherein the manual operation of the assembly includes a manual operation of the handle by rotating the handle about the axis to thereby rotate the first lever to pull the first cable.

7. The assembly according to claim 5, further including a powered actuator operatively connected to the second lever, wherein the powered operation of the assembly includes the powered actuator rotating the second lever to thereby:
 - pull the second cable; and
 - rotate the first lever to pull the first cable.

8. The assembly according to claim 4, wherein during operation of the first lever and operation of the second lever:
 - the first lever is rotated about the axis in a first rotational direction;
 - the first cable is pulled away from the first latch and toward the assembly; and
 - the second cable is pulled away from the second latch and toward the assembly.

9. A door comprising:
 - a first latch that can be actuated or not actuated, when the door is in a closed position and the first latch is not actuated, the first latch holds the door in the closed position,
 - a second latch that can be actuated or not actuated, when the door is in an opened position and the second latch is not actuated, the second latch holds the door in the opened position,
 - an opening and closing assembly having a powered operation and a manual operation, the assembly being operatively connected to the first latch for actuating the first latch, and operatively connected to the second latch for actuating the second latch, and
 - a manually operated handle operatively connected to the assembly, wherein manually operating the handle produces the manual operation of the assembly;
 - wherein during the powered operation, the assembly actuates the first latch and actuates the second latch;
 - wherein during the manual operation, the assembly actuates the first latch and does not actuate the second latch; and
 - wherein said manually operating the handle does not cause the powered operation of the assembly.

10. The door according to claim 9, further including a first cable and a second cable, wherein:
 - the first cable operatively connects the assembly to the first latch;
 - the second cable operatively connects the assembly to the second latch; and
 - the assembly actuates the first latch by pulling the first cable and actuates the second latch by pulling the second cable.

11. The door according to claim 10, wherein:
 - the first cable is pulled by the assembly during the powered operation and during the manual operation; and
 - the second cable is pulled by the assembly during the powered operation and not during the manual operation.

12. The door according to claim 10, wherein:
 - the assembly further includes a first lever and a second lever;
 - the first lever is connected to the first latch by the first cable, and is operable to pull the first cable;
 - the second lever is connected to the second latch by the second cable, and is operable to pull the second cable;
 - the first lever and the second lever are both operated during the powered operation of the assembly; and
 - the first lever is operated during the manual operation of the assembly, and
 - the second lever is not operated during the manual operation of the assembly.

13. The door according to claim 12, wherein:

operation of the second lever causes operation of the first lever; and operation of the first lever does not cause operation of the second lever.

14. The door according to claim 13, wherein the assembly further includes a powered actuator operatively connected to the second lever, wherein the powered operation includes the powered actuator operating the second lever to thereby:

pull the second cable; and operate the first lever to pull the first cable.

15. The door according to claim 14, wherein:

the first lever and the second lever are rotatably mounted to the assembly;

the powered actuator operates the second lever by rotating the second lever, which causes the first lever to rotate.

16. A vehicle including the door according to claim 10, wherein the door is a sliding door of the vehicle that slides between the opened position and the closed position.

17. The door according to claim 9, wherein the handle is rotatably mounted to the assembly, and said manually operating the handle includes rotating the handle.

18. The assembly according to claim 9, wherein the manually operated handle is disposed on an inside of the door so as to be accessible from inside a passenger compartment of a vehicle on which the door is disposed.

19. A door comprising:

a first latch for holding the door in a closed position;

a second latch for holding the door in an opened position;

a first cable operatively connected to the first latch for unlatching the first latch when the first cable is pulled;

a second cable operatively connected to the second latch for unlatching the second latch when the second cable is pulled;

an opening and closing assembly having a powered operation and a manual operation, the assembly being operatively connected to the first cable for unlatching the first latch, and operatively connected to the second cable for unlatching the second latch, and a manually operated handle disposed on an interior side of the door and operatively connected to the assembly, wherein manually operating the handle corresponds with the manual operation of the assembly to unlatch only the first latch, and wherein the assembly includes a manually operable lock disposed on an interior side of the door and operatively connected to the manually operated handle for locking the manually operated handle in an actuated position wherein the first latch is unlatched.

* * * * *